US010379970B2

(12) United States Patent
Mangu et al.

(10) Patent No.: US 10,379,970 B2
(45) Date of Patent: Aug. 13, 2019

(54) AUTOMATIC DESIGN DISCREPANCY REPORTING

(71) Applicant: Adobe Inc., San Jose, CA (US)

(72) Inventors: Shashidhar Mangu, Bangalore (IN); Shamit Kumar Mehta, Delhi (IN); Nikhil Gupta, Noida (IN); Abhishek Garg, Rohini (IN)

(73) Assignee: Adobe, Inc., San Jose, CA (US)

( * ) Notice: Subject to any disclaimer, the term of this patent is extended or adjusted under 35 U.S.C. 154(b) by 158 days.

(21) Appl. No.: 15/715,670

(22) Filed: Sep. 26, 2017

(65) Prior Publication Data

US 2019/0095292 A1    Mar. 28, 2019

(51) Int. Cl.
*G06F 11/16*    (2006.01)
*G06F 11/00*    (2006.01)
*G06F 3/0481*    (2013.01)

(52) U.S. Cl.
CPC ........ *G06F 11/162* (2013.01); *G06F 3/04817* (2013.01); *G06F 11/004* (2013.01)

(58) Field of Classification Search
CPC ............................... G06F 11/16; G06F 11/162
USPC ......................................................... 714/57
See application file for complete search history.

(56) References Cited

U.S. PATENT DOCUMENTS

| | | | | |
|---|---|---|---|---|
| 4,864,569 A * | 9/1989 | DeLucia | ................... | G06F 8/71 714/38.1 |
| 6,256,773 B1 * | 7/2001 | Bowman-Amuah | ..... | G06F 8/71 707/999.202 |
| 6,324,647 B1 * | 11/2001 | Bowman-Amuah | ........................ | H04L 63/0227 709/223 |
| 6,370,573 B1 * | 4/2002 | Bowman-Amuah | ..... | G06F 8/20 709/223 |
| 6,405,364 B1 * | 6/2002 | Bowman-Amuah | ........................ | G06Q 10/06 717/101 |
| 6,536,037 B1 * | 3/2003 | Guheen | ..................... | G06F 8/71 703/2 |
| 6,662,357 B1 * | 12/2003 | Bowman-Amuah | ..... | G06F 8/20 717/120 |
| 8,667,406 B1 * | 3/2014 | Thakur | ................. | G06F 3/0481 715/764 |
| 9,811,914 B2 * | 11/2017 | Grunberg | ............... | H04N 5/217 |
| 2001/0052108 A1 * | 12/2001 | Bowman-Amuah | ........................ | G06O 10/06 717/100 |

(Continued)

*Primary Examiner* — Kamini B Patel
(74) *Attorney, Agent, or Firm* — SBMC

(57) ABSTRACT

A digital medium environment is described for automatic design discrepancy reporting of discrepancies between an actual display and its intended design. In one example, a design validation system generates a design screen model for a design screen, based on an object included in the design screen and at least one display property that defines a visual appearance of the object. The design validation system then identifies an application object that has a similar visual appearance to the defined visual appearance of the object of the design screen model. The design validation system additionally determines that a discrepancy exists between a display of the design screen model object and the application object. The design validation system also determines a value by which the at least one property of the application object is to be adjusted and outputs the value to adjust the at least one display property of the application object.

20 Claims, 8 Drawing Sheets

(56) References Cited

U.S. PATENT DOCUMENTS

| | | | | |
|---|---|---|---|---|
| 2006/0294577 A1* | 12/2006 | Gouda | ............... | H04L 63/0263 |
| | | | | 726/1 |
| 2009/0232358 A1* | 9/2009 | Cross | ................ | G06K 9/00818 |
| | | | | 382/103 |
| 2010/0100860 A1* | 4/2010 | Chang | ................ | G06F 17/5027 |
| | | | | 716/111 |

* cited by examiner

AUTOMATIC DESIGN DISCREPANCY REPORTING

BACKGROUND

During the development of an application, extensive feedback is exchanged between application design and development platforms, implemented using computing devices, to verify that the final application corresponds to its intended design. However, design platforms operate using file formats that are incompatible with development platforms, and vice versa. For instance, a vector-based design file may be used by an application design platform to illustrate a desired layout of various design elements to be displayed by an application user interface. Each element is defined by a set of display properties that describe how a display element is to be presented, such as an origin location, a size, an element type, an element opacity, and so on.

Conventional application development platforms are unable to import design files and determine the specific display properties associated with each display element. As such, conventional approaches to developing applications require a design file to specifically articulate each desired display property for every object in an application. However, these conventional approaches are susceptible to error, as an application development platform is unable to verify that display properties are accurately translated from a design platform. Accordingly, a final application build may result in objects having different display properties than their intended design. Thus, conventional approaches for identifying design discrepancies in application displays remain unreliable and inefficient.

SUMMARY

A digital medium environment is described to facilitate automatic design discrepancy reporting for variations between an application screen display and its intended design. In one example, a design validation system is implemented at least partially in hardware of a computing device. The design validation system receives a design file that includes at least one design screen, representing a template for an application to be developed. The design validation system additionally receives an application that includes at least one application screen developed based on the design file as a template.

The design validation system parses each design screen included in the design file to generate a design screen model and an artboard rendition for the design screen. The design screen model is generated based on an object included in the design screen and at least one display property that defines a visual appearance of the object. For instance, a design screen model can include individual nodes representing each object in a design screen, with information that describes a display position, display bounds, a display color, and so on for the represented object. The artboard rendition is an image representation of the design screen that is useable by the design validation system to identify an application screen object that has a similar visual appearance to the object of the design screen model.

Upon identifying that the application object included in the application screen has a similar visual appearance to the defined visual appearance of the object of the design screen model, the design validation system determines whether a display discrepancy exists. Specifically, the design validation system determines whether a discrepancy exists between at least one display property of the object in the design screen and at least one display property of the application object.

In response to a determination that a discrepancy does exist, the design validation system then determines a value by which the at least one display property of the application object is to be adjusted in order to at least partially remedy the discrepancy. The design validation system proceeds to output the value to adjust the at least one display property of the application object.

In some implementations, this value is output as included in a validation report. The validation report is generated by the design validation system to identify the value, the application object, and the at least one display property to which the discrepancy corresponds. The validation report, for instance, provides a visual description of design discrepancies, a textual description of design discrepancies, a video description of design discrepancies, an audio description of design discrepancies, or combinations thereof. Alternatively or additionally, the validation report includes an automatically modified application screen that is generated such that there are no display discrepancies when compared to a corresponding design screen.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
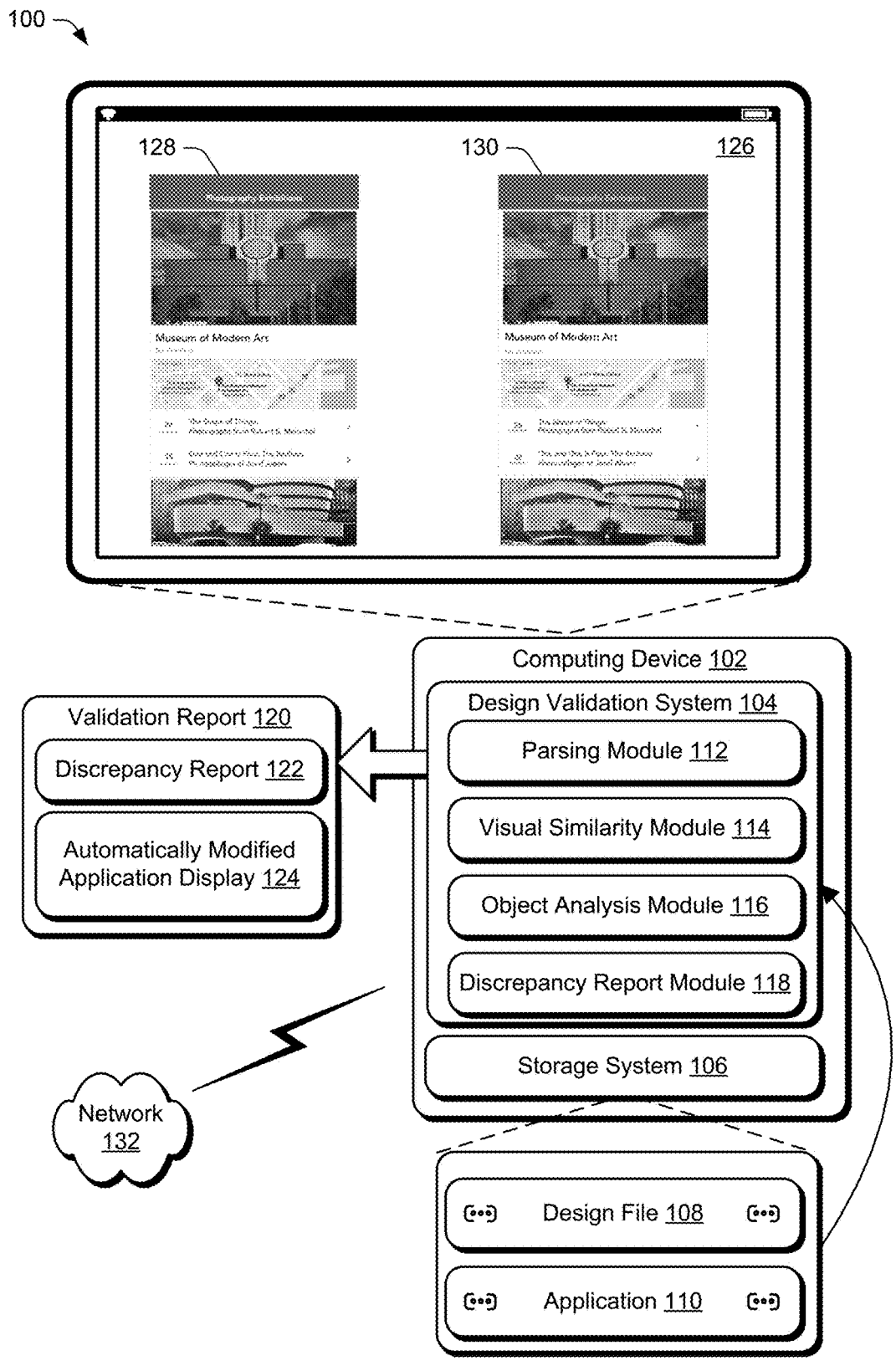
FIG. 1 is an illustration of an environment in an example implementation that is operable to employ automatic design discrepancy reporting as described herein.

Applications are often developed through a series of revisions based on feedback exchanged between application design platforms and development platforms in order to correct any errors in an application prototype. However, because design platforms and development platforms operate using disparate file types, conventional approaches are unable to verify that display properties specified in a design file correctly translate to an application build. For instance, conventional techniques for identifying discrepancies between an application design and an application build are limited to juxtaposing the design against the build to identify discrepancies. However, these juxtaposing techniques are limited in that they cannot clearly identify minor discrepancies between display properties. Thus, conventional techniques are for verifying that an application build corresponds to its intended design are unreliable and limited to identifying major discrepancies.

Accordingly, systems and techniques for automatic design discrepancy reporting are described herein. To ensure that an actual display of an application screen corresponds to an intended design for the screen, a computing device automatically compares the application screen against a design screen to identify display discrepancies. The computing device then automatically generates a validation report that indicates whether there are any discrepancies between display properties of a design screen and display properties of an application screen.

In addition to identifying whether there are any discrepancies between an application screen and its intended design, the validation report specifically identifies transformations in order to at least partially remedy the identified discrepancies. The computing device, for instance, may visually distinguish objects with display discrepancies from objects that display as intended. An object can be visually distinguished from other objects by altering a transparency value of the object, generating a border for display around the object, displaying an arrow indicator pointing to the object, and so forth. Thus, the computing device is configured to precisely identify objects in an application build that appear differently from their intended design, even when the display discrepancies would otherwise be undetected by casual observation. In some instances, the computing device generates an automatically modified application screen, which at least partially remedies discrepancies otherwise identified in the validation report such that the modified application screen displays as intended.

In the following discussion, an example environment is described that may employ the techniques described herein. Example procedures are then described which may be performed in the example environment as well as other environments. Consequently, performance of the example procedures is not limited to the example environment and the example environment is not limited to performance of the example procedures.

Terms

The term "design file" refers to a visual representation of an intended display for an application. As described herein, a design file is presumed to be a structured document including at least one object that depicts a desired appearance of the at least one object to be displayed by an application. For example, the design file may be formatted as a vector-based file that represents a user interface display for an application. A design file may include multiple design screens, where each design screen represents a different user interface for an application.

The term "application file" refers to a computer program designed to perform a group of coordinated functions, tasks, or activities. As described herein, an application file refers to an executable file that was generated in order to have a similar visual appearance to the design file. The application file may include multiple application screens, where each application screen corresponds to a different user interface of the application.

The term "object" refers to a visual component of a user interface. As described herein, an object refers to any content displayed by a user interface, such as an image, a title, text, a video, a hyperlink, a map, a calendar, and so forth.

The term "artboard rendition" refers to an image representation of a design screen included in a design file. For example, while the design screen may be formatted as a vector-based file, an artboard rendition of the design screen is formatted as an image that is useable in the image-based comparison techniques to identify visually similar images.

The term "design screen model" refers to a file that includes information describing each object included in a design screen along with display properties that define a visual appearance for each object. For example, a design screen model may be formatted as a hierarchical tree of individual nodes, where each node includes information describing an object and its associated display properties, as included in the design screen.

The term "display property" refers to information that is useable to describe a visual appearance of an object. For instance, a display property may specify an origin location for an object, which indicates a display position for an upper-left corner of the object. Other example display properties include information specifying bounds of a display area for an object, fill attributes of an object, an object type, an opacity value for an object, stroke attributes of an object, an object weight, an object style, an object color, a text style for an object, and so forth.

The term "validation report" refers to a document that includes a visual description of display property discrepancies between a design screen and an application screen, a textual description of display property discrepancies, a video description of display property discrepancies, an audio description of display property discrepancies, or combinations thereof. The validation report additionally includes information specifying a transformation to apply to an object's display property in the application screen in order for the application screen to display exactly the same as the display screen. The validation report may also include an automatically modified application display, which represents a version of the application screen generated by applying the transformation to the display property of the object in the application screen.

The term "transformation" refers to an instruction for altering an object's display property. For example, a transformation may include a plain language description of how an object's display property is to be altered. Alternatively or additionally, a transformation includes a declarative command useable to alter a display property of an object.

The term "user input" refers to any command initiated by a user to control functionality of, or interact with, a computing device. Examples of user inputs are commands received via an input device such as a touchscreen, a mouse, a keyboard, a microphone, and so on.

The term "user interface" refers to the means by which a user and a computing device interact through implementation of display devices such as computer screens, televisions, projectors, wearable light guides, and so on.

Example Environment

FIG. 1 is an illustration of an environment 100 in an example implementation that is operable to employ automatic design discrepancy reporting using the techniques described herein. The illustrated environment 100 includes a computing device 102 that automatically identifies discrepancies between display properties for an object of a design file and display properties for a corresponding application object. Identified discrepancies are output as a validation report that identifies specific discrepancies between display properties of the respective objects. Thus, the validation report precisely specifies how to alter display properties of certain objects in order for the application's resulting display to conform to its intended design. In some implementations, a validation report includes an automatically modified application display for incorporation into an application build.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business.

The computing device 102 is illustrated as including design validation system 104. Design validation system 104 is implemented at least partially in hardware of computing device 102 (e.g., using a processing system and computer-readable storage media) to automatically identify discrepancies between a design file and an application and to generate a validation report describing these discrepancies. As described in further detail below, in order to identify discrepancies between elements of a design file and elements of an application, the design validation system is configured to parse a design file to generate a design file model that includes metadata describing display properties of each element in the display file. The design validation system 104 compares the design file model with an application build to identify discrepancies between the design file and the application and generates a report that describes these discrepancies in specific detail.

In some implementations, the design validation system 104 is implemented as a plugin for an integrated development environment, such as an XCode environment, a Visual Studio environment, and so on. Alternatively or additionally, the design validation system 104 can be integrated into hardware of a user interface test automation framework system. Although illustrated as implemented locally at the computing device 102, functionality of the design validation system 104 may also be implemented in whose or part via functionality available over network 132, such as part of a web service or "in the cloud" as further described in relation to FIG. 7. Furthermore, the design validation system 104 is extendable to any suitable computing device platform. As such, functionality of the design validation system 104 is useable at any point in an application's development or execution timeline, such as during build, at runtime, and so forth.

The design validation system 104 is configured to perform the techniques described herein upon receiving a design file 108 for a corresponding application 110. In accordance with one or more implementations, the design file 108 is received via user input at the computing device 102. Alternatively, the design file 108 is received from a computing device remote to the computing device 102, such as via network 132. The design file 108 includes at least one design screen, which in turn includes at least one object for display. For instance, the design file 108 may represent the design screen 128, illustrated at a user interface display area 126 of the computing device 102. As described herein, the design file 108 represents an intended design for an application user interface.

In accordance with one or more implementations, the application 110 is developed based on the design file 108 and is received via user input at the computing device 102. For instance, an application developer may use computing device 102 to code and develop application 110. Alternatively, the application 110 is received from a computing device remote to the computing device 102, such as from a different computing device via network 132. As described herein, the application 110 includes at least one application screen for display. Each application screen in application 110 represents a user interface for the application. Similarly, each application screen is designed based on a corresponding design screen included in the design file 108. For instance, the application 110 may include an application screen 130, illustrated at display area 126, which was developed using the design screen 128 as a template. In accordance with one or more implementations, the design file 108 and the application 110 are stored at storage system 106 of the computing device 102, such as in computer-readable storage media as further described in relation to FIG. 8.

An example of functionality incorporated by the design validation system 104 to perform automatic design discrepancy reporting is illustrated as parsing module 112, visual similarity module 114, object analysis module 116, and discrepancy report module 118. The parsing module 112, visual similarity module 114, object analysis module 116, and discrepancy report module 118 are implemented at least partially in hardware (e.g., processing system and computer-readable storage media) of the computing device 102.

The parsing module 112, for instance, monitors for receipt of a design file 108 at the computing device 102. Upon receipt of the design file 108, the parsing module 112 identifies at least one design screen included in the design file 108. For each design screen, the parsing module generates a design screen model and an artboard rendition, as described in further detail below with respect to FIGS. 2 and 3. After generating a design screen model and an artboard rendition for each design screen in the design file 108, the parsing module 112 communicates the design screen model and the artboard rendition to the visual similarity module 114.

The visual similarity module 114 is additionally configured to receive an application screen from application 110. In some implementations, application 110 includes multiple application screens. As such, the visual similarity module 114 is configured to receive and store any number of application screens included in application 110. For each application screen, the visual similarity module 114 identifies a visually similar artboard rendition. In some implementations, the visual similarity module 114 identifies the visually similar artboard rendition using image-based comparison techniques, such as a Maximally Stable Extremal Regions (MSER) technique. The visual similarity module 114 may alternatively use any suitable image-based comparison technique to identify the visually similar artboard rendition, such as pixel-based comparison techniques and so forth.

Accordingly, the visual similarity module 114 is configured to identify a design screen in the design file 108 that was used as a template to develop an application screen in application 110. Additionally, the visual similarity module 114 identifies a design screen model that corresponds to the visually similar artboard rendition and designates the design screen model as an artboard model. The visual similarity module 114 then communicates the artboard model and the corresponding application screen to the object analysis module 116 for analysis.

The object analysis module 116 is representative of functionality to analyze an artboard model and an application screen and ascertain information describing objects displayed by the artboard model and the application screen. Additionally, the object analysis module 116 is configured to derive information describing the display properties for each object in the artboard model and each object in the application screen. The object analysis module 116 then communicates information describing a design object from the artboard model, along with display properties that define a display appearance of the object, for each object in the artboard model.

Similarly, the object analysis module communicates information describing an application object from the application screen, along with properties that define a display appearance of the object, for each object in the application screen. In this manner, the object analysis module 116 determines information describing an object and its respective display properties for each object in the artboard model and each object in the application screen. The object analysis module 116 then communicates the object information to the discrepancy report module 118.

The discrepancy report module 118 is representative of functionality to determine whether there are any differences in display properties of an object included in the design file 108 and a corresponding object included in the application 110. For instance, using information provided by the object analysis module 116, the discrepancy report module 118 can precisely identify any display discrepancies between corresponding objects. As described herein, display discrepancies include any difference in an object's appearance from its intended design. Thus, a discrepancy refers to a difference between display properties for two objects, such as a difference in display position, a difference in color, a difference in text style, a difference in display size, and so on.

Because the discrepancy report module 118 identifies display discrepancies using information derived by object analysis module 116, the design validation system 104 can detect display differences that would otherwise be unrecognizable by the human eye. For instance, the discrepancy report module 118 can identify that an object in design file 108 is displayed as having a 70% transparency value, while a corresponding object in the application 110 is displayed as having a 69% transparency value. Although the single percentage difference in transparency value may be unobservable by the human eye, this discrepancy in display properties is readily identifiable based on information generated by object analysis module 116. As such, the design validation system 104 is configured to detect and identify discrepancies that would otherwise not be evidenced by conventional techniques. Upon identifying a discrepancy between display properties for an object of the design file 108 and an object of the application 110, the discrepancy report module 118 generates a validation report 120 that specifically describes the identified discrepancies.

As referenced herein, the validation report 120 includes information describing all discrepancies between an object's intended display, as represented by the design file 108, and the object's actual display in the application 110. The validation report 120 can describe display property discrepancies using textual descriptions, image descriptions, audio descriptions, video descriptions, or combinations thereof. For instance, the validation report 120 may include a discrepancy report 122. In some implementations, the discrepancy report 122 includes a visual representation of an application screen from the application 110. Alternatively or additionally, the discrepancy report 122 includes indicators that identify which objects in the application 110 possess different display properties in comparison to corresponding objects in the design file 108. Alternatively or additionally, the discrepancy report 122 indicates a particular display property to be changed, along with a value to adjust the display property in order to at least partially remedy a discrepancy.

In some implementations, the discrepancy report module 118 is configured to generate an automatically modified application display 124. For instance, upon determining display discrepancies between the application screen 130 and the design screen 128, the discrepancy report module 118 generates a copy of the application screen 130. The discrepancy report module 118 then automatically modifies display properties of at least one object in the application screen 130 to eliminate any discrepancies otherwise noted in discrepancy report 122.

In this manner, the discrepancy report module 118 is configured to generate an automatically modified application display 124, without user input, which is representative of the design screen 128 configured in a format that is compatible with the application 110. In some implementations, the discrepancy report module 118 generates a validation report 120 that includes both an automatically modified application display 124, along with a discrepancy report 122 that describes changes made to the application screen 130 in order to generate the automatically modified application display 124.

Thus, the design validation system 104 is configured to automatically identify any discrepancies in a display of the application 110 from an intended display for the application, as described by the design file 108. Similarly, the design validation system 104 is configured to generate a validation report 120 that specifically identifies objects with display discrepancies, along with specific remedial steps to be taken in order to at least partially remedy the display discrepancies. Example operations of the design validation system 104 is described as follows and shown in corresponding features.

Figure 2:
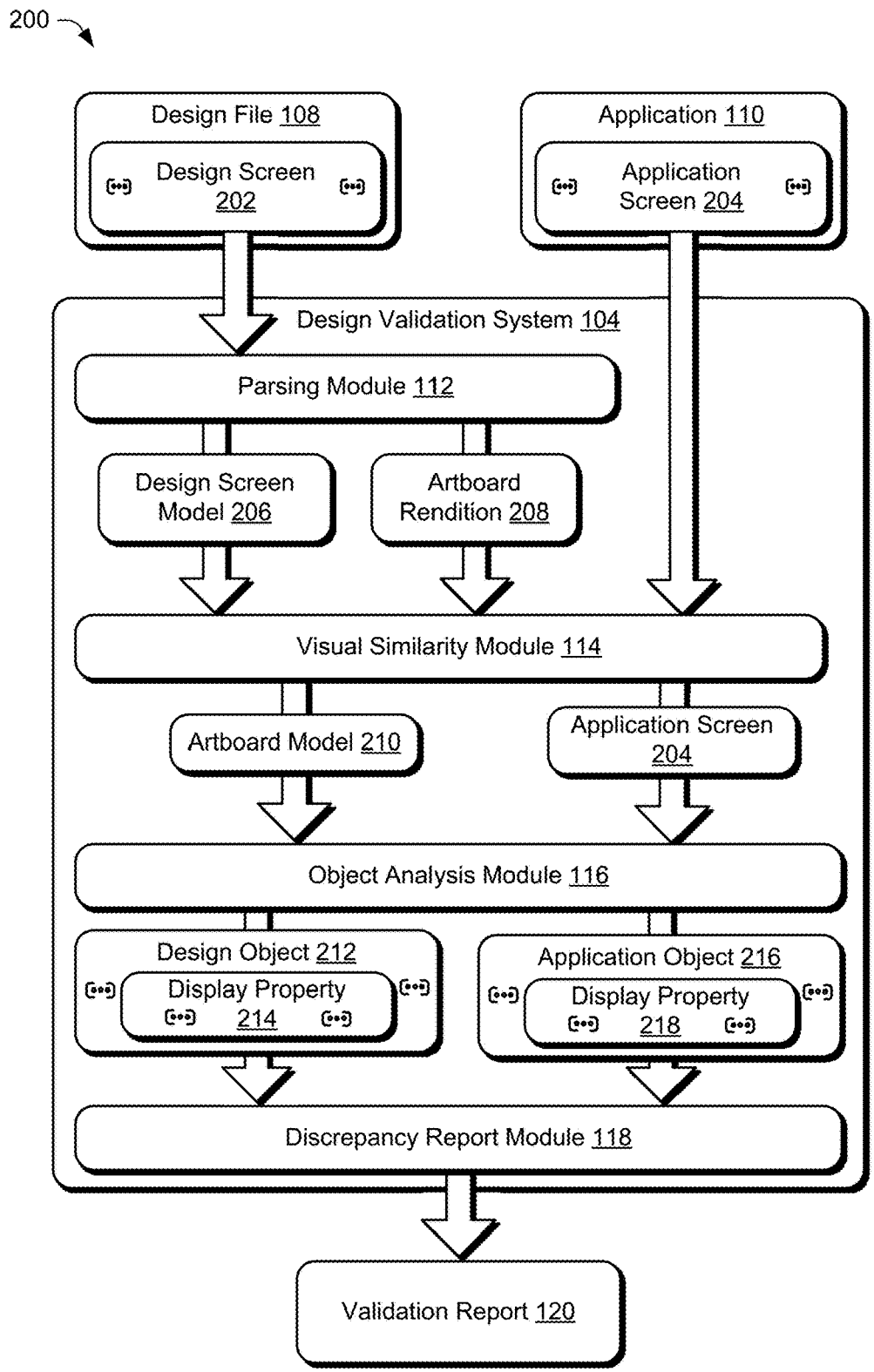
FIG. 2 depicts a system in an example implementation showing operation of a design validation system of FIG. 1 in greater detail.

FIG. 2 depicts a system 200 in an example implementation showing operation of the design validation system 104 of FIG. 1 in greater detail. To begin, the design validation system 104 receives a design file 108. As described herein, design file 108 includes at least one design screen 202 that represents an intended display for an application to be developed. The design screen 202 includes at least one object for display, such as an image object, a text object, and so on. In some implementations, the design validation system 104 receives the design file 108 via user input from the computing device 102 of FIG. 1. Alternatively, the design file 108 is received at a computing device implementing the design validation system 104 from a remote device, such as via network 132.

Upon receiving the design file 108, the design validation system 104 transmits the design file to parsing module 112. The parsing module 112 generates a design screen model and an artboard rendition for each design screen included in the design file 108. For instance, upon receiving the design file 108, the parsing module 112 generates a design screen model 206 and an artboard rendition 208 for the design screen 202.

As described herein, the design screen model 206 is generated based on an object included in the design screen and at least one display property that defines a visual appearance of the object. Thus, the design screen model 206 includes information describing each object included in the design screen 202, along with display properties that define an appearance of the object. In some implementations, the design file 108 is formatted as a vector-based design file that can be analyzed by the parsing module 112 to identify characteristics of objects displayed in a design screen 202. The manner in which the parsing module 112 analyzes the design file 108 depends on a format of the design file 108. For instance, the parsing module 112 may generate a document object model from the design file 108, which represents a hierarchical structure that describes characteristics of objects displayed in the design screen 202. The artboard rendition 208 is representative of an image generated by the parsing module 112 that represents the design screen 202. Using the techniques described herein, the parsing module 112 is configured to generate the artboard rendition 208 in any suitable image format.

The design validation system 104 additionally receives an application 110, which is representative of an application that is developed using the design file 108 as a template. The application 110 includes at least one application screen 204, which represents an actual user interface display for the application 110. The application screen 110 includes at least one object for display, such as a text object, an image object, and so on. In some implementations, the design validation system 104 receives the application 110 via user input from a computing device implementing the design validation system 104, such as computing device 102 of FIG. 1. Alternatively, the application 110 is received from a computing device remote to a computing device implementing the design validation system, such as from a different computing device via network 132.

After generating the design screen model 206 and the artboard rendition 208, the design validation system 104 communicates the design screen model 206, the artboard rendition, and the application 110 to the visual similarity module 114. The design validation system 104 communicates separate design screen models and artboard renditions for each design screen 202 included in the design file 108. In this manner, the visual similarity module 114 stores a repository of multiple design screen models 206 and artboard renditions 208 that are representative of each design screen 202 included in the design file 108.

The visual similarity module 114 then selects an application screen from the application 110 and proceeds to identify a visually similar artboard rendition. For instance, the visual similarity module 114 selects application screen 204 and performs an image-based comparison of the application screen 204 against the artboard renditions 208 generated by the parsing module 112.

In some implementations, the visual similarity module 114 performs the image-based comparison using MSER to identify an application object included in the application screen that has a similar visual appearance to the defined visual appearance of the object of the artboard rendition. However, any suitable image-based comparison technique may be used by the visual similarity module 114 to identify a visually similar artboard rendition. In some implementations, the visual similarity module 114 receives user input that specifies an artboard rendition to which the application screen 204 corresponds.

Upon identifying a visually similar artboard rendition for the application screen 204, the visual similarity module 114 identifies a design screen model that corresponds to the visually similar artboard rendition. For instance, the visual similarity module 114 may identify that the artboard rendition 208 is visually similar to the application screen 204 and was generated from the design screen 202, which represents an intended design of the application screen 204.

The visual similarity module 114 then determines that the design screen model 206 was also generated from the design screen 202 and designates the design screen model 206 as the artboard model 210. Thus, the visual similarity module 114 identifies the artboard model 210 that includes information describing a defined visual appearance for all objects in the design screen 202 from which the application screen 204 was developed.

The visual similarity module 114 communicates the artboard model 210 and the application screen 204 to the object analysis module 116. Upon receiving the artboard model 210 and the application screen 204, the object analysis module 116 analyzes display properties of the artboard model 210 and the application screen 204. For instance, the object analysis module 116 analyzes information describing design object 212 and all display properties 214 that define a visual appearance of the design object 212.

The object analysis module 116 identifies information describing each design object 212, and its display properties 214, included in the artboard model 210. Similarly, the object analysis module 116 identifies information describing each application object 216, and its display properties 218, included in the application screen 204.

For each design object 212, the object analysis module 116 identifies a visually similar application object 216 and compares the display properties 214 of the design object 212 against display properties 218 of the application object 216. In some implementations, the object analysis module 116 initially identifies a design object 212 that is visually similar to an application object 216 based on display properties 218 describing an origin value and bounds of the application object 216.

The object analysis module 116 then searches the artboard model 210 for a design object 212 with display properties 214 that describe an origin value and bounds, within a threshold difference from the display properties 218. Alternatively or additionally, the object analysis module performs template matching to identify a design object 212 that is visually similar to the application object 216. In some implementations, the object analysis module 116 identifies a design object 212 that is visually similar to the application 216 based on user input received at a computing device implementing the design validation system 104, such as computing device 102 of FIG. 1.

Upon identifying a design object 212 that is visually similar to the application object 216, the object analysis module 116 determines whether there are any discrepancies between display properties 218 and display properties 214. In this manner, the object analysis module 116 is able to determine whether the application object 216 has any differences in visual appearance from the design object 212. For example, the object analysis module 116 precisely identifies differences in an origin value, bound limits, fill attributes, object type, opacity value, stroke attributes, object weight, object style, object color, cap style, corner style, dash style, text style, and so forth. The object analysis module 116 subsequently communicates information describing any discrepancies between display properties of the application object 216 and display properties of the design object 212 to the discrepancy report module 118.

Using the information received from the object analysis module 116, the discrepancy report module 118 generates validation report 120. As described herein, validation report 120 summarizes discrepancies between a visual appearance of the application screen 204 and its intended design, as depicted by design screen 202. In some implementations, the validation report 120 includes a visual representation of objects included in the application screen 204 that do not include the exact set of display properties as included in design screen 202. For instance, the validation report 120 includes a display of the application screen 204 and visually emphasizes an object in the application screen 204 that includes display properties that differ from intended display properties.

Alternatively or additionally, the validation report 120 includes a description for each object in the application screen 204 that indicates whether there are any discrepancies in the object's display properties. For instance, the description may specify that there are no discrepancies and that the object displays as intended by the design file 108. Alternatively, the description specifies that there are discrepancies in the object's display properties. Furthermore, the description identifies a value by which the display property of the object is to be adjusted in order to at least partially remedy the discrepancy. The description provided by the validation report includes one or more of an image, a textual, an audio, or a video description that specifies any discrepancies in the object's display properties.

In some implementations, the validation report 120 includes an automatically modified application display, such as automatically modified application display 124 of FIG. 1. As described herein, the automatically modified application display 124 represents a copy of the application screen 204, generated by the discrepancy report module 118. However, the automatically modified application display 124 differs from the application screen 204 in that a display property of an application object 216 is modified to at least partially remedy any display discrepancies. In this manner, the discrepancy report module 118 is configured to generate an automatically modified application display 124, independent of any user input, which is formatted the same as the application screen 204. Further discussion of an example validation report 120 is discussed in further detail below with respect to FIG. 4.

Figure 3:
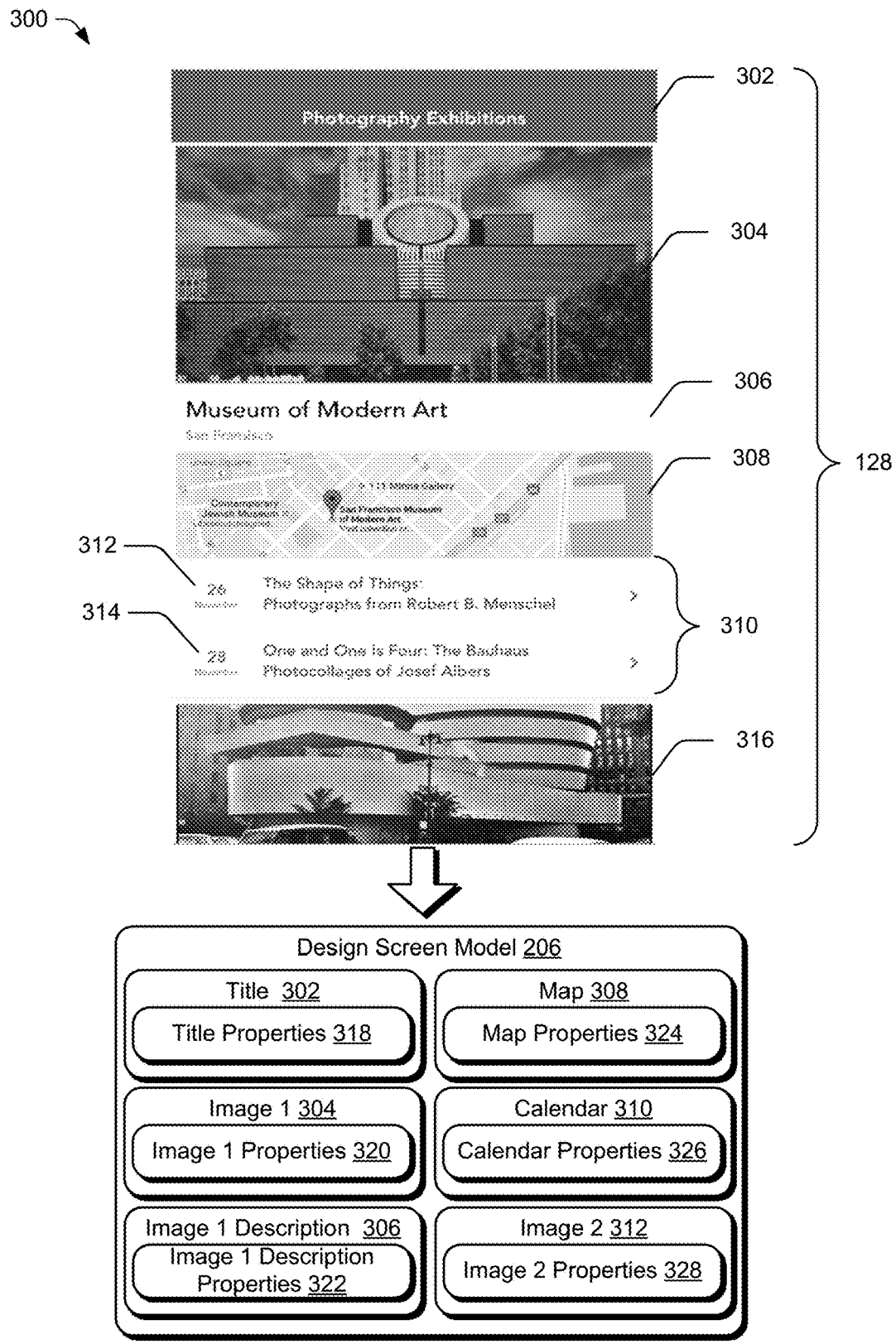
FIG. 3 depicts an example implementation showing an example design screen model generated from a design screen of a design file.

FIG. 3 depicts an example implementation 300 showing a design screen model for a design screen generated using the automatic design discrepancy reporting techniques described herein. In the illustrated example, the design screen 128 represents an intended display for an application to be developed. For example, the design screen 128 includes a display of information pertaining to photography exhibitions at a museum. Specifically, the design screen 128 includes a title object 302, an image 1 object 304, an image 1 description object 306, a map object 308, a calendar object 310, and an image 2 object 312. Although illustrated as including objects 302, 304, 306, 308, 310, and 312, a design screen may include any suitable number of objects. Similarly, the type of objects that can be included in a design screen are not limited to the types of objects illustrated in the example implementation 300.

The title object 302 is illustrated as including a textual description for an overall display of the design screen 128. For example, the design screen 128 includes a display of content pertaining to photography exhibitions, as indicated by the title object 302. The design screen 128 additionally includes image 1 object 304, which includes an image for display as part of the design screen 128. The image 1 description object 306 is illustrated as including a textual description of the image 1 object. For example, as illustrated in the example implementation 300, the image 1 description object 306 describes that the image 1 object 304 includes a display of the Museum of Modern Art in San Francisco.

The map object 308 is illustrated as including a map that displays a location of the Museum of Modern Art, as depicted by image 1 object 304 and described by the image 1 description object 306. The calendar object 310 is illustrated as including a listing of events and corresponding dates that will occur at the Museum of Modern Art. The calendar object 310 may optionally be categorized as individual calendar objects 312 and 314. For example, calendar object 312 corresponds to a display regarding a photography exhibition scheduled for November 26, titled "The Shape of Things: Photographs from Robert B. Menschel". Likewise, calendar object 314 corresponds to a display regarding a photography exhibition scheduled for November 28, titled "One and One is Four: The Bauhaus Photocollages of Josef Albers". Finally, the design screen 128 includes an image 2 object 316, which includes an image for display as part of the design screen 128. Thus, the design screen 128 provides a visual representation of an intended layout for a user interface of an application screen.

Using the automatic design discrepancy reporting techniques described herein, the design screen model 206 is generated from the design screen 128. For example, the parsing module 112 of the design validation system 104 is configured to analyze the design screen 128. The parsing module 112 generates the design screen model 206 based on an object included in the design screen and at least one display property that defines a visual appearance of the object. Thus, the design screen model 206 includes information describing each object included in the design screen 128, along with display properties defining a visual appearance of each object. For example, the design screen model 206 includes information describing the title object 302 and display properties of the title object, represented as title properties 318.

The design screen model additionally includes information describing image 1 object 304 and image 1 display properties 320, information describing image 1 description object 306 and image 1 description properties 322, information describing map object 308 and map properties 324, information describing calendar object 310 and calendar properties 326, and information describing image 2 object 312 and image 2 properties 328. As described herein, information describing each object and display properties of each object is included in metadata of the design screen model 206.

Display properties associated with each object included in the design screen 128 include any type of quantifiable value that may be used to describe a visual appearance of a corresponding object. For example, display properties of an object can specify an origin location for the object, which corresponds to display coordinates of an upper-left corner of the object. Alternatively or additionally, display properties can specify bounds of an object, which specify display locations for edges of the object.

Alternatively or additionally, display properties can specify an object type for the object, such as a bitmap object, a gradient object, a solid object, an image object, a textual object, and so forth. Alternatively or additionally, display properties can describe fill attributes of an object, an opacity value for an object, stroke attributes of an object, an object weight, an object style, an object color, a text style for the object, a cap value for the object, a corner style for the object, a dash style for the object, and so on. Thus, display properties for an object as included in metadata of the design screen model 206 include information that describes exactly how an object is intended to be displayed according to a design file.

Figure 4:
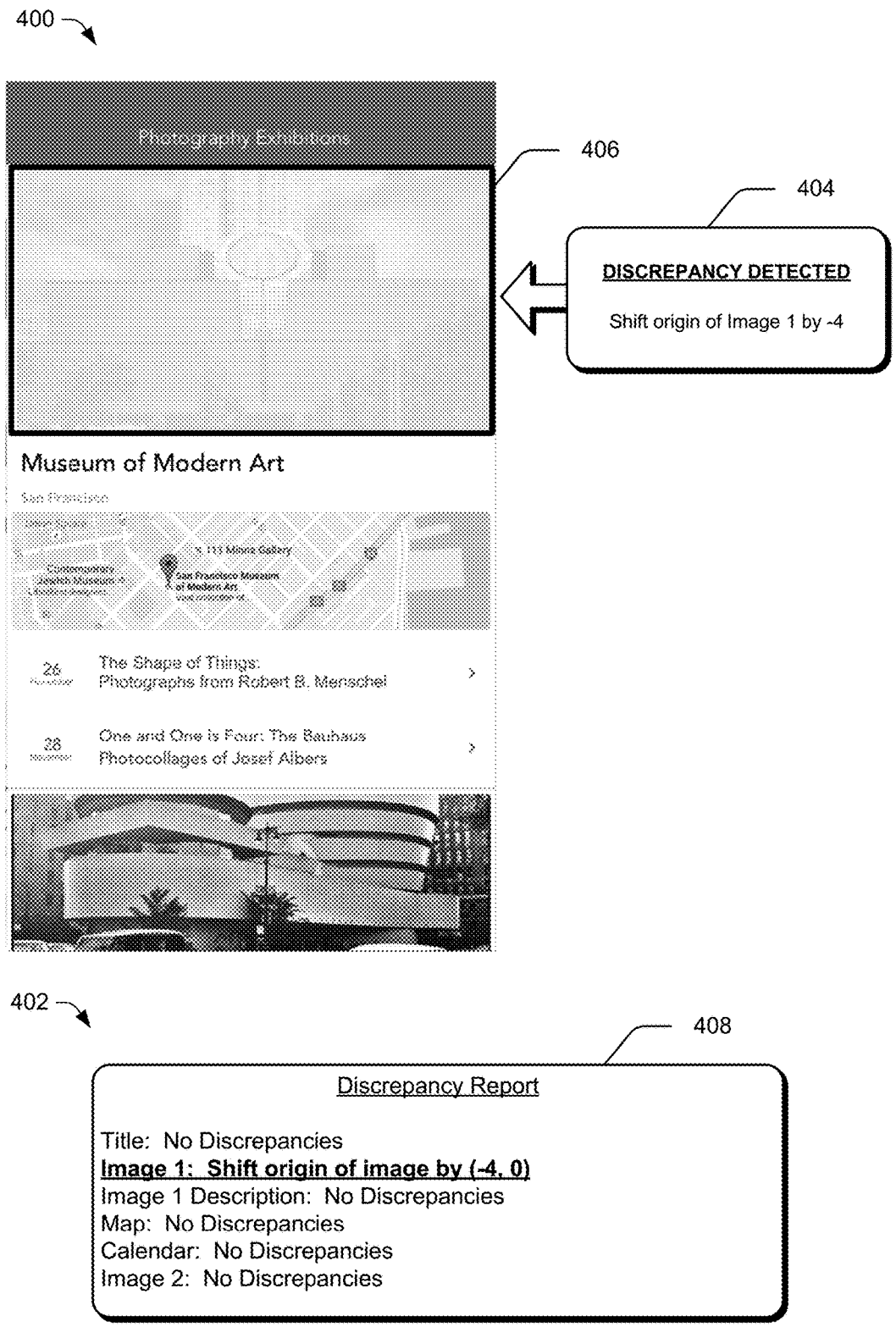
FIG. 4 depicts an example implementation showing validation reports generated using the automatic design discrepancy reporting techniques as described herein.

FIG. 4 depicts an implementation showing example validation reports 400 and 402, which are generated using the automatic design discrepancy reporting techniques described herein. In the illustrated example, validation reports 400 and 402 are generated by the design validation system 104. The validation report 400 visually and textually describes discrepancies between a design screen model and a visually similar application screen. For instance, the validation report 400 identifies discrepancies between display properties of the design screen model 300 illustrated in FIG. 3 and display properties of a visually similar application screen.

In the illustrated example, validation report 400 describes a discrepancy between a display property of an image 1 object 406 and a designed display property of the image 1 object 406, as represented by image 1 object 304 in FIG. 3. Specifically, the validation report 400 indicates that an origin of the image 1 object 406 differs from an origin of the corresponding image 1 object 304 by a value of 4. In the illustrated example, image 1 object 406 is depicted as being visually distinguishable from other objects of the application screen with display properties that conform to their intended design. For example, image 1 object 406 is depicted with a thick border and having an increased degree of transparency from an actual appearance of the image 1 object 406. In this manner, the validation report 400 readily identifies a particular object with display properties that are different from intended display properties as represented in a design screen.

In order to specifically describe object display property discrepancies, the validation report 400 includes a textual description 404 that identifies an alteration for an object display property that will at least partially remedy an identified discrepancy. For instance, the textual description 404 indicates that an origin of the image 1 object 406 needs to be shifted by a value of negative four in one direction and maintained in a different direction. In a Cartesian coordinate system, this textual description 404 specifies that the image 1 object 406 needs to be shifted to the left by four increments, such as by four pixels, in order for the image 1 object 406 to be displayed as intended.

The example validation report 402 represents a different type of validation report, which includes only a textual description 408 describing discrepancies between a design screen model and an application screen. The example validation report 402 can be generated by the discrepancy report module 118 of the design validation system 104 using the techniques described herein. In the illustrated example, the textual description 408 includes a listing of each object included in an application screen, such as application screen 204 of FIG. 2. The textual description 408 additionally includes an explanation next to each object that describes whether there are any discrepancies identified for the display properties of that object.

For instance, the textual description 408 specifies that there are no discrepancies for the title object, the image 1 description object, the map object, the calendar object, and the image 2 object. Thus, the textual description 408 of the validation report 402 affirms that the title, image 1 description, map, calendar, and image 2 objects are displayed in an application screen as intended by a design file representation. Similarly, the textual description 408 specifies that there is a discrepancy between a display property of the image 1 object in the application screen and a display property of the image 1 object as described by the design screen model. In some implementations, a description of an object and corresponding discrepancies can be displayed by textual description 408 in a visually distinct manner from a description of other objects that have no discrepancies. For instance, the description of the image 1 object and its origin discrepancies is displayed in bold and underlined text in the textual description 408.

Thus, the techniques described herein generate a validation report that specifically describes discrepancies between a resulting display of an application screen and its intended display as specified by a design screen model. The validation report additionally describes precise values by which a display property is to be adjusted in order to at least partially remedy the discrepancy. In some implementations, generation of the validation reports 400 and 402 is performed by a design validation system, such as design validation system 104 of computing device 102, as illustrated in FIG. 1.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
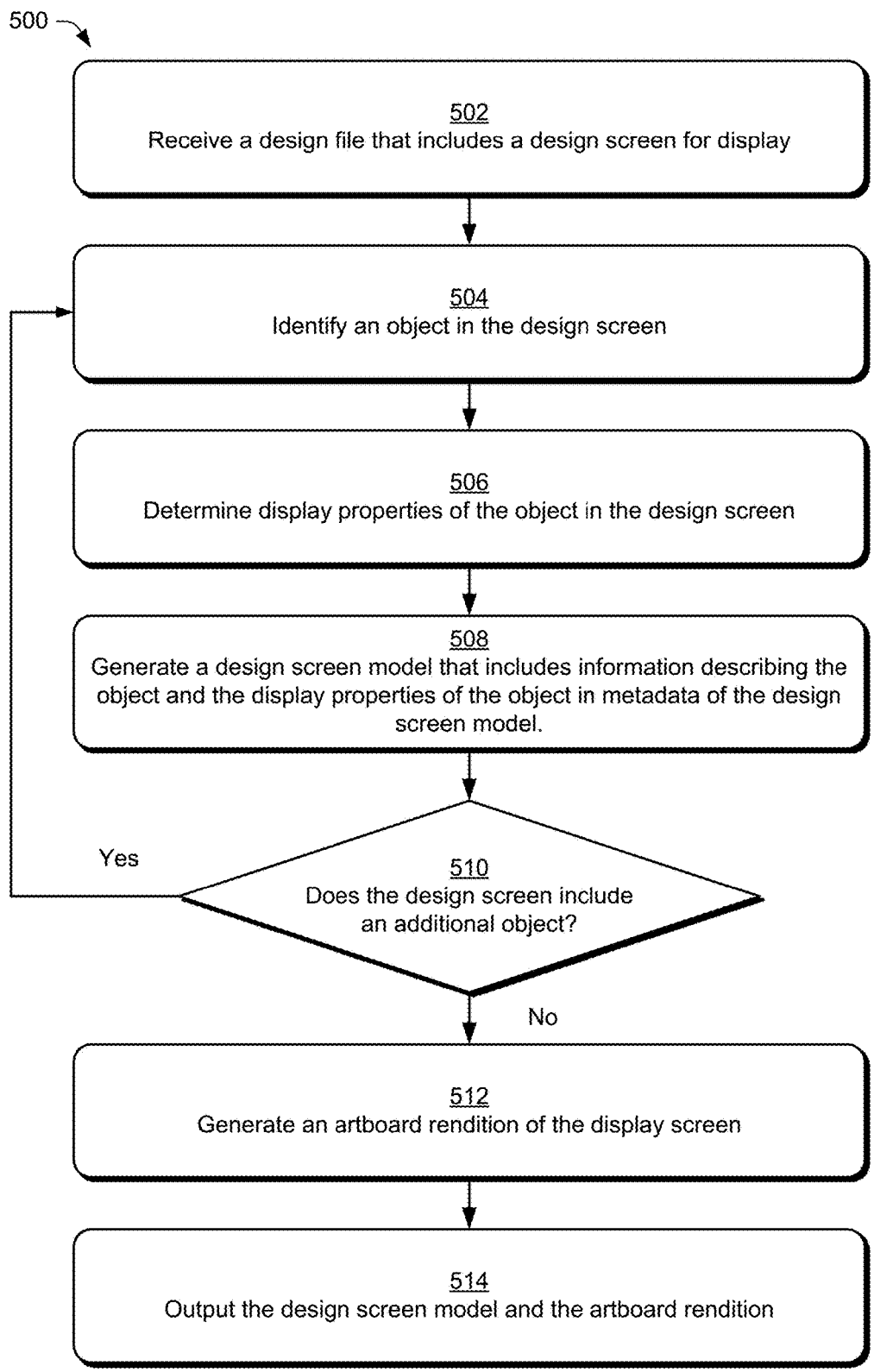
FIG. 5 is a flow diagram depicting a procedure in an example implementation of automatic design discrepancy reporting.

FIG. 5 depicts a procedure 500 in an example implementation of automatic design discrepancy reporting. A design file that includes a design screen for display is received (block 502). The computing device 102, for instance, receives design file 108 from an input device of the computing device 102. Alternatively, the computing device 102 receives design file 108 from a different computing device, such as via network 132.

The received design file includes at least one screen for display, which represents an intended display layout for a corresponding application screen to be developed based on the design file. For instance, the design file can include at least one design screen 202, from which at least one application screen 204 is to be developed, as illustrated in FIG. 2. The received design file may be formatted as any suitable type of graphic design file, such as a vector-based design file.

In response to receiving the design file, an object is identified in the design screen (block 504). The parsing module 112, for instance, receives design screen 202. In response to receiving the design screen 202, the parsing module 112 identifies an object in the design screen, such as a title object 302, as illustrated in FIG. 3. As described herein, the parsing module 112 is configured to implement any suitable object recognition technique, such as an edge detection technique, a primal sketch technique, and so on.

In response to detecting the object in the design screen, display properties of the object are determined (block 506). The parsing module 112, for instance, analyzes the object in the design screen, such as the title object 302, to determine display properties of the title object 302. As described herein, an object's display properties include any information that is useable to define an appearance of the object as rendered on a display screen. Example display properties for an object include an origin location for the object, a display bound for the object, a fill attribute for the object, an object type, an opacity value for the object, stroke attributes for the object, a weight of the object, a style of the object, a color of the object, a text style displayed by the object, a cap type of the object, a corner style for the object, a dash style of the object, and so on.

In response to determining the display properties of the object in the design screen, a design screen model that includes information describing the object and the determined display properties of the object is generated (block 508). The parsing module 112, for instance, is configured to generate the design screen model 206 from the design screen 202. The design screen model is generated based on an object included in the design screen and at least one display property that defines the visual appearance of the object. Thus, information describing the object and the display properties of the object are included in metadata of the design screen model 206. In this manner, a design screen model includes information describing an object and its display properties for an object in a design screen from which the design screen model was generated.

After generating the design screen model, a determination is made as to whether the design screen includes an additional object that is not already described in the design screen model (block 510). The parsing module 112, for instance, may analyze design screen 202 to determine whether there are any objects in the design screen 202 that are not described in metadata of the design screen model 206. In response to determining that the design screen 202 includes an additional object not described by the design screen model 206, the computing device 102 returns to block 504 to identify the additional object. The parsing module 112 proceeds to determine display properties of the additional object and adds information describing the additional object and its display properties to the generated design screen model.

In response to determining that the design screen does not include an additional object, an artboard model of the design screen is generated (block 512). The parsing module 112, for instance, generates the artboard rendition 208 for the design screen 202. The artboard rendition 208 is an image representation of the design screen 202 that can be used by the visual similarity module 114 to determine visual similarity between an application screen 204 and a design screen 202. As described herein, the visual similarity module 114 can compare an application screen 204 against a repository of different artboard renditions 208 to identify an artboard rendition that most closely correlates with the application screen 204.

In response to generating the design screen model and the artboard rendition, the design screen model and the artboard rendition are output (block 514). The parsing module 112, for instance, outputs the design screen model 206 and the artboard rendition 208 to the visual similarity module 114 for use in performing the automatic design discrepancy reporting techniques described herein. Alternatively or additionally, the parsing module 112 may output the generated design screen model 206 and the generated artboard rendition to a display of the computing device 102 for review to verify that the objects, their associated display properties, and the artboard rendition accurately represent the design screen 202.

In this manner, a design screen model and an artboard rendition are generated that precisely describe a layout configuration of objects in a design screen. The artboard rendition can be used to identify a display screen, and corresponding design screen model, that represent counterparts to a particular application screen. The design screen model can then be used to verify that a layout of the application screen displays as intended.

Figure 6:
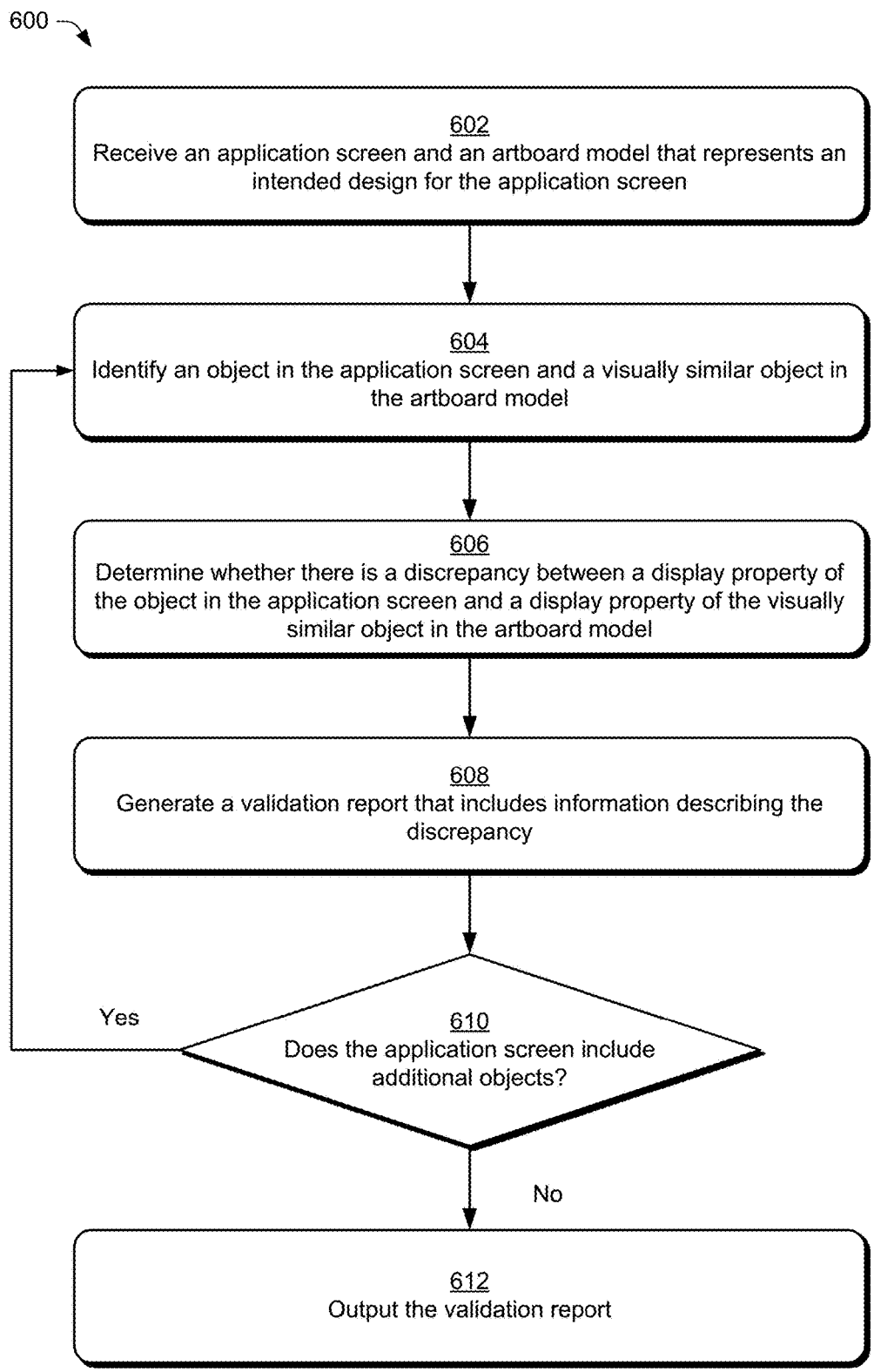
FIG. 6 is a flow diagram depicting a procedure in an example implementation of automatic design discrepancy reporting.

FIG. 6 depicts a procedure 600 in an example implementation of automatic design discrepancy reporting. An application screen and an artboard model that represents an intended design for the application screen are received (block 602). The object analysis module 116, for instance, receives the artboard model 210 and the application screen 204 from the visual similarity module 114. As described herein, the artboard model 210 is representative of a design screen model 206 that represents an intended design of the application screen 204. For example, the visual similarity module 114 correlates the application screen 204 with the artboard rendition 208, identifies that design screen model 206 was generated from the same display screen as the artboard rendition 208, and selects the design screen model 206 as the artboard model 210.

In response to receiving the application screen and the artboard model, an object in the application screen and a visually similar object in the artboard model are identified (block 604). The object analysis module 116, for instance, identifies the design object 212 in the artboard model 210 and identifies a visually similar application object 216 in the application screen 204.

In some implementations, the object analysis module 116 identifies the design object 212 in the artboard model 210 by selecting a first design object from a list of design objects in the artboard model 210. The object analysis module 116 then determines the display properties 214 associated with the design object 212 and searches the application screen 204 to identify a visually similar application object 216 that includes similar display properties 218.

In some implementations, the object analysis module 116 initially searches for the application object 216 based on display properties 214 that describe an origin and bounds of the display object 212. If the display properties 218 describe that an origin and bounds of the application object 216 are within a threshold difference from the origin and bounds of the display object 212, the application object 216 is identified as being visually similar to the display object 212. This threshold difference may be any suitable value, and may be indicated by user input or pre-specified by the design validation system 104.

Alternatively or additionally, if the application object 216 is not identified as having an origin and bounds that lie within the threshold difference from an origin and bounds of the design object 212, the object analysis module 116 proceeds to perform template matching to identify an application object that is visually similar to the design object 212. As described herein, template matching refers to any suitable technique for performing object recognition among images.

In response to identifying the object in the application screen and the visually similar object in the artboard model, a determination is made as to whether there is a discrepancy between a display property of the object in the application screen and a display property of the visually similar object in the artboard model (block 606). The object analysis module 116, for instance, compares the display properties 214 of the design object 212 against the display properties 218 of the application object 216.

After determining whether there is a discrepancy between a display property of the object in the application screen and a display property of the visually similar object in the artboard model, a validation report is generated that includes information describing the discrepancy (block 608). For instance, the discrepancy report module 118 may receive information from the object analysis module 116 and generate the validation report 120 describing any discrepancy between the design object 212 and the visually similar application object 216. The validation report further includes a value by which a display property of the visually similar application object 216 is to be adjusted in order to at least partially remedy the discrepancy.

In some implementations, the validation report 120 includes a visual representation of the application screen along with a description of the detected discrepancy. In some implementations, the validation report 120 includes a visual representation of the application screen that visually distinguishes the application object with display property discrepancies from other application objects that do not have display property discrepancies. Alternatively or additionally, the generated discrepancy report includes a description of the application object in the application screen, along with an explanation of any display property discrepancies associated with the application object.

In some implementations, the validation report 120 includes an automatically modified application display, such as automatically modified application display 124 of FIG. 1. The discrepancy report module 118 is configured to generate the automatically modified application display 124 by generating a copy of the application screen 204 and modifying at least one display property 218 of an application object 216. An amount by which the display property 218 of the application object 216 is modified is specified by the value included in the validation report 120, such that there the discrepancy between display properties of the application object 216 and a corresponding design object 212 is at least partially mitigated. Thus, the design validation system 104 is configured to generate an application screen that displays as intended by a design screen using the techniques described herein.

In this manner, the generated validation report provides a visual explanation of what application objects need to be visually adjusted in order to conform to an intended design for an application screen. Similarly, the generated validation report includes detailed instructions describing a transformation to be made in order for the application screen to be displayed as intended.

In response to generating the validation report, a determination is made as to whether the application screen includes additional objects (block 610). For instance, the discrepancy report module 118 analyzes information received from the object analysis module 116 to determine whether the application screen 204 includes an additional object. In response to determining that the application screen includes an additional object, the design validation system returns to block 604 and proceeds to determine whether there are discrepancies between display properties of the additional object and a visually similar additional object in the design screen. Information describing discrepancies the additional object and its designed display properties are then added to the validation report.

In response to determining that the application screen does not include an additional object, the validation report is output (block 612). The discrepancy report module 118, for instance, outputs the validation report 120 for display at the computing device 120. Alternatively or additionally, the discrepancy report module 118 outputs the validation report 120 to storage of the computing device 120 for future use and review. In this manner, the design validation system 104 is configured to generate a validation report that specifically identifies discrepancies between an object's actual display and its intended design, along with specific transformations necessary to achieve the intended design.

Figure 7:
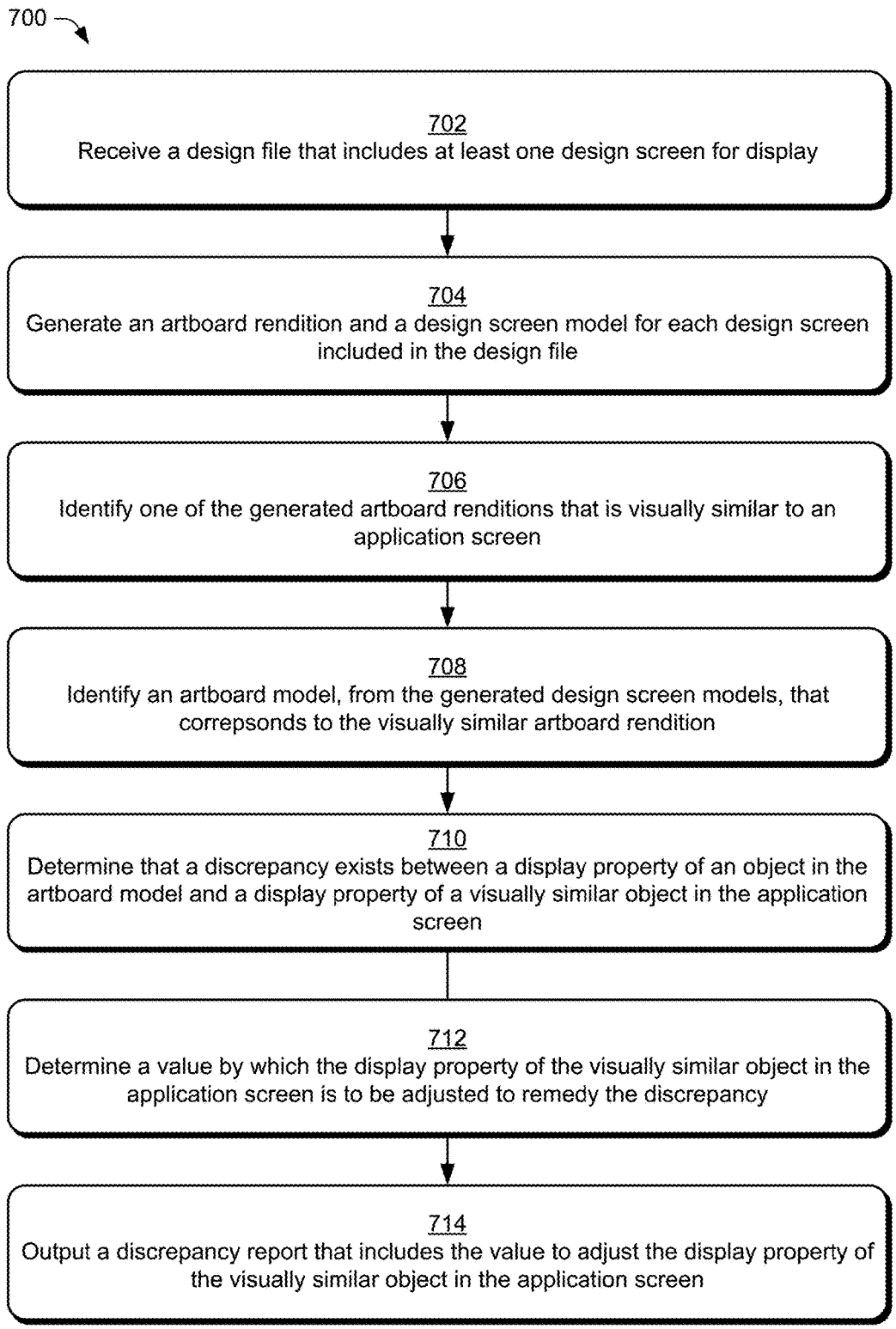
FIG. 7 is a flow diagram depicting a procedure in an example implementation of automatic design discrepancy reporting.

FIG. 7 depicts a procedure 700 in an example implementation of automatic design discrepancy reporting. A design file that includes at least one design screen for display is received (block 702). The computing device 102, for instance, receives a design file 108 that includes at least one design screen 202 from an input device of the computing device 102. Alternatively, the computing device 102 receives the design file 108 from a computing device that is remote to computing device 102.

In response to receiving the design file, a design screen model and an artboard rendition are generated for each design screen included in the design file (block 704). The parsing module 112 of the design validation system 104, for instance, generates the design screen model 206 and the artboard rendition 208 for each design screen 202 included in the design file 108. The design screen model 206 is generated based on an object included in the design screen and display properties that define a visual appearance of the object. Thus, a design screen model includes information describing objects in the design screen and all display properties associated with each object. The artboard rendition is an image representation of the design screen that is useable to perform visual comparison with an application screen using the techniques described herein.

In response to generating the design screen model and the artboard rendition, an artboard rendition is identified as being visually similar to an application screen (block 706). The visual similarity module 114 of the design validation system 104, for instance, identifies an artboard rendition 208 that is visually similar to an application screen 204. The visual similarity module 114 is configured to identify a visually similar artboard rendition using any suitable image-based comparison technique, such as MSER. Alternatively or additionally, the visual similarity module 114 identifies a visually similar artboard rendition for an application screen based on user input identifying the visually similar artboard.

In response to identifying the visually similar artboard rendition, an artboard model is identified from the generated design screen models that corresponds to the visually similar artboard rendition (block 708). The visual similarity module 114, for instance, determines that the artboard rendition 208 was generated from the design screen 202 and identifies the design screen model 206 that was also generated from the design screen 202. The visual similarity module 114 then designates the identified design screen model 206 as the artboard model 210.

In response to identifying the artboard model, a discrepancy between a display property of an object in the artboard model and a corresponding display property of an object in the application screen is determined (block 710). The object analysis module 116, for instance, identifies a design object 212 in the artboard model and a visually similar application object 216 in the application screen 204. The object analysis module 116 then proceeds to determine whether there are any differences between the display properties 214 of the design object 212 and the display properties 218 of the application object 216. The object analysis module is configured to determine whether there are display property discrepancies for every object included in the application screen 204.

In response to identifying such a discrepancy, a value by which the display property of the visually similar object in the application screen is to be adjusted to remedy the discrepancy is determined (block 712). The discrepancy report module 118, for instance, identifies display property values for the object in the artboard model and the visually similar object in the display screen and determines a value by which at least one display property differs between the objects. For instance, the discrepancy report module 118 may determine that a luminance value of an object in the application screen needs to be decreased by an increment of two in order to achieve a same luminance value of the visually similar object in the artboard model.

In response to identifying the value by which the display property of the visually similar object is to be adjusted, a discrepancy report that includes the determined value is output (block 714). The discrepancy report module 118, for instance, compiles information describing the display property discrepancies and associated values into the validation report 120 and outputs the validation report 120. The validation report 120 may include a discrepancy report 122, such as example the discrepancy reports 400 and 402 illustrated in FIG. 4. Alternatively or additionally, the validation report 120 may include an automatically modified application display 124, which represents a modified version of the application screen 204 such that there are no discrepancies between the automatically modified application display 124 and the design screen 202.

Thus, the design validation system 104 is configured to receive a design file and an application and determine whether there are any display discrepancies between a display of the application and its intended design. The design validation system 104 the generates a report describing these discrepancies, along with specific object transformations to be applied in order for the application screen to display as intended.

Example System and Device

Figure 8:
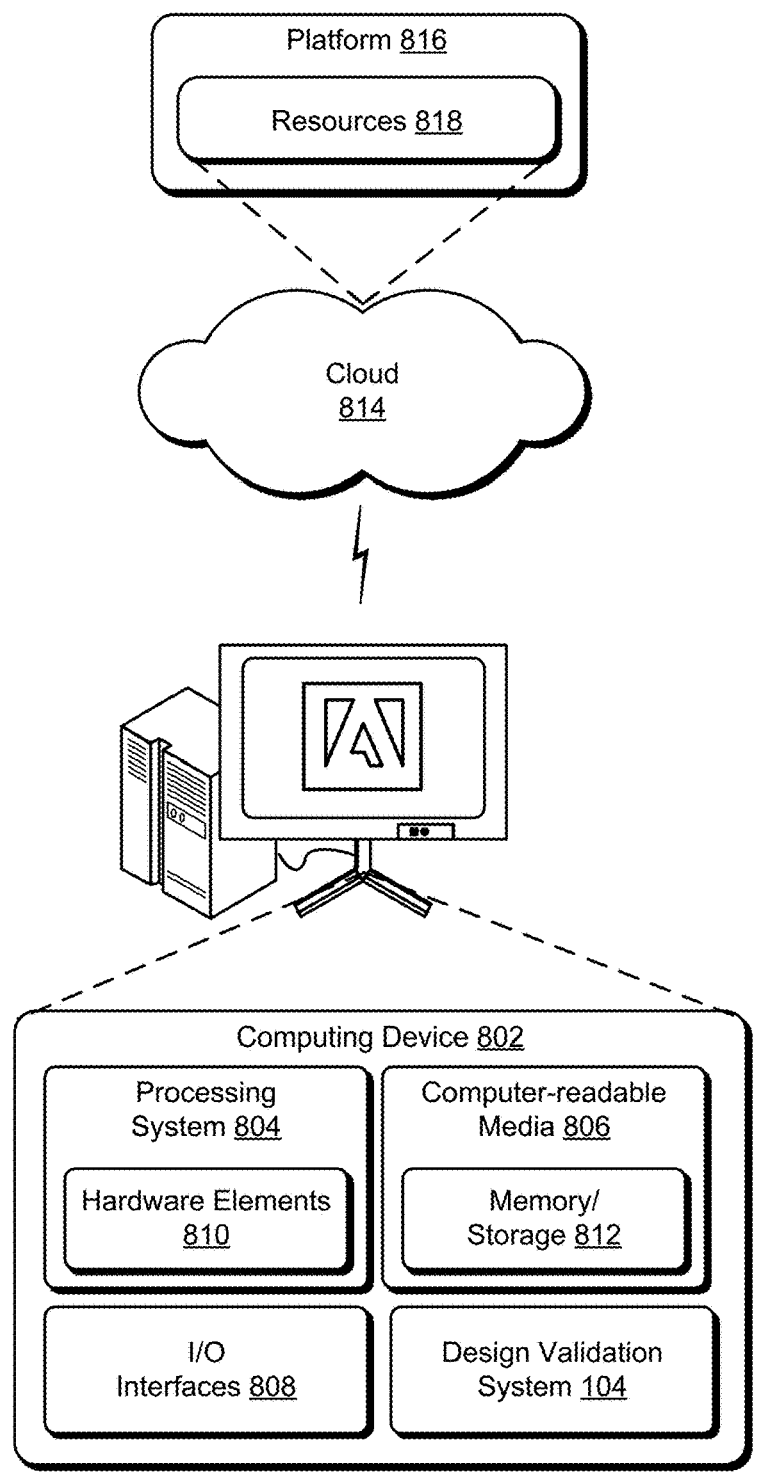
FIG. 8 illustrates an example system including various components of an example device that can be implemented as any type of computing device as described and/or utilized with reference to FIGS. 1-7 to implement embodiments of the techniques described herein.

FIG. 8 illustrates an example system generally at 800 that includes an example computing device 802 that is representative of one or more computing systems and/or devices that may implement the various techniques described herein. This is illustrated through inclusion of the design validation system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described systems, modules, and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to facilitate automatic design discrepancy reporting, a method implemented by at least one computing device, the method comprising:
   generating, by the at least one computing device, a design screen model for a design screen, the design screen model based on an object included in the design screen and at least one display property that defines a visual appearance of the object;
   identifying, by the at least one computing device, an application object included in an application screen that has a similar visual appearance to the defined visual appearance of the object of the design screen model;
   determining, by the at least one computing device, that a discrepancy exists between the at least one display property for the object in the design screen model and at least one display property of the application object;
   determining, by the at least one computing device, a value by which the at least one display property of the application object is to be adjusted in order to at least partially remedy the discrepancy; and
   outputting, by the at least one computing device, the value to adjust the at least one display property of the application object.

2. The method of claim 1, further comprising generating, by the at least one computing device, an artboard rendition of the design screen that includes an image representation of the design screen and associating the artboard rendition with the design screen model.

3. The method of claim 2, further comprising identifying, by the at least one computing device, that the design screen model correlates to the application screen based on an image-based comparison of the application object included in the application screen and the artboard rendition.

4. The method of claim 3, wherein the image-based comparison is performed, by the at least one computing device, using a Maximally Stable Extremal Regions (MSER) comparison technique.

5. The method of claim 1, wherein the identifying that the application object included in the application screen has the similar visual appearance to the defined visual appearance of the object of the design screen model includes identifying that the object of the design screen model has an origin value that is within a threshold difference from an origin value of the application object.

6. The method of claim 1, wherein the identifying that the application object included in the application screen that has the similar visual appearance to the defined visual appearance of the object of the design screen model is based on identifying that the object of the design screen model has a bound limit that is within a threshold difference from a bound limit of the application object.

7. The method of claim 1, wherein the identifying that the application object included in the application screen that has the similar visual appearance to the defined visual appearance of the object of the design screen model is based on performing template matching, by the at least one computing device, in response to determining that a difference between an origin value for the object of the design screen model and an origin value for the application object is greater than a threshold difference.

8. The method of claim 1, wherein the object included in the design screen model and the application object are both a title object, an image object, a text object, a menu object, a video object, a hyperlink object, an icon object, a map object, or a calendar object.

9. The method of claim 1, wherein the at least one display property for the object included in the design screen model and the at least one display property of the application object both specify an origin value, a bound limit, a fill attribute, an object type, an opacity value, a stroke attribute, an object weight, an object style, a color, or a text style.

10. The method of claim 1, wherein the determining of the value includes comparing, by the at least one computing device, the at least one display property for the object in the design screen model with the at least one display property of the application object and determining that the at least one display property of the application object is equivalent to the one of the display properties for the object in the design screen in response to adjustment by the value.

11. The method of claim 10, wherein the outputting of the value to adjust the at least one display property of the application object includes generating a declarative command that adjusts the at least one display property of the application object by the value.

12. The method of claim 1, wherein the design screen is formatted as a vector-based design file and the application screen is formatted differently than the design screen.

13. In a digital medium environment to facilitate automatic design discrepancy reporting, a system comprising:
 a parsing module implemented at least partially in hardware of a computing device to generate an artboard rendition and a design screen model for each of a plurality of design screens, each said artboard rendition including an image representation of the design screen and each said design screen model based on an object included in the design screen and at least one display property that defines a visual appearance of the object;
 a visual similarity module implemented at least partially in hardware of the computing device to identify one of the generated artboard renditions that is visually similar to an application screen that includes an application object for display;
 an object analysis module implemented at least partially in hardware of the computing device to identify at least one said design screen model that corresponds to the visually similar artboard rendition and determine a discrepancy between the at least one display property of the object and at least one display property of the application object; and
 a discrepancy report module implemented at least partially in hardware of the computing device to:
  generate a transformation that indicates a value by which the at least one display property of the application object is to be adjusted in order to at least partially remedy the discrepancy;
  generate an automatically modified application display by creating a copy of the application screen and adjusting the at least one display property of the application object by the value; and
  output the automatically modified application display.

14. The system of claim 13, wherein the parsing module includes information describing the object in the design screen and information describing the at least one display property of the object in metadata of the design screen model.

15. The system of claim 13, wherein the at least one said design screen includes at least one additional object and the parsing module includes information describing the at least one additional object and at least one display property that defines a visual appearance of the at least one additional object.

16. The system of claim 13, wherein the visual similarity module identifies the visually similar artboard rendition from an image-based comparison of the application screen with a repository of multiple said artboard renditions.

17. The system of claim 13, wherein a format of the automatically modified application display is the same as a format of the application screen.

18. The system of claim 13, wherein the automatically modified application display identifies the application object and describes the value by which the at least one display property of the application object is adjusted.

19. In a digital medium environment to facilitate automatic design discrepancy reporting, a system comprising:
 means for generating a design screen model, for a design screen, based on an object included in the design screen and at least one display property that defines a visual appearance of the object;
 means for determining that a discrepancy exists between the at least one display property of the object and at least one display property of an application object that defines a visual appearance of the application object in an application screen;
 means for determining a value by which the at least one display property of the application object is to be adjusted in order to at least partially remedy the discrepancy;
 means for generating a transformation to adjust the at least one display property of the application object by the value; and
 means for outputting a validation report that describes the application object and the transformation.

20. The system of claim 19, further comprising means for generating an automatically modified application display, independent of user input, by creating a copy of the application screen and applying the transformation to the application object.

* * * * *